United States Patent
Pan et al.

(10) Patent No.: US 10,284,773 B2
(45) Date of Patent: May 7, 2019

(54) METHOD AND APPARATUS FOR PREVENTING PHOTOGRAPH FROM BEING SHIELDED

(71) Applicant: Xiaomi Inc., Beijing (CN)

(72) Inventors: Long Pan, Beijing (CN); Guangjian Wang, Beijing (CN); Ruixian Zhu, Beijing (CN)

(73) Assignee: XIAOMI INC., Beijing (CN)

( * ) Notice: Subject to any disclaimer, the term of this patent is extended or adjusted under 35 U.S.C. 154(b) by 103 days.

(21) Appl. No.: 15/372,029

(22) Filed: Dec. 7, 2016

(65) Prior Publication Data
US 2017/0163883 A1    Jun. 8, 2017

(30) Foreign Application Priority Data
Dec. 8, 2015   (CN) .......................... 2015 1 0897800

(51) Int. Cl.
| | |
|---|---|
| H04N 5/232 | (2006.01) |
| G06T 7/90 | (2017.01) |
| G06K 9/00 | (2006.01) |
| G06K 9/62 | (2006.01) |
| H04N 5/235 | (2006.01) |
| G08B 7/06 | (2006.01) |
| G06T 7/20 | (2017.01) |
| G06T 7/13 | (2017.01) |

(52) U.S. Cl.
CPC ..... *H04N 5/23222* (2013.01); *G06K 9/00067* (2013.01); *G06K 9/6212* (2013.01); *G06T 7/13* (2017.01); *G06T 7/20* (2013.01); *G06T 7/90* (2017.01); *G08B 7/06* (2013.01); *H04N 5/2351* (2013.01); *H04N 5/23229* (2013.01); *H04N 5/23293* (2013.01); *G06T 2207/30241* (2013.01)

(58) Field of Classification Search
CPC ........... H04N 5/23222; H04N 5/23229; H04N 5/23293; H04N 5/2351; G06K 9/6212; G06T 7/13; G06T 7/20; G06T 2207/30241; G08B 7/06
See application file for complete search history.

(56) References Cited

U.S. PATENT DOCUMENTS

| | | |
|---|---|---|
| 2004/0012682 A1 | 1/2004 | Kosaka et al. |
| 2009/0046197 A1 | 2/2009 | Ishijima |

(Continued)

FOREIGN PATENT DOCUMENTS

| | | |
|---|---|---|
| CN | 102111532 A | 6/2011 |
| CN | 102156380 A | 8/2011 |
| CN | 102694971 A | 9/2012 |

(Continued)

OTHER PUBLICATIONS

Extended European Search Report dated May 23, 2017 for European Application No. 16202972.2, 8 pages.

(Continued)

*Primary Examiner* — Christopher K Peterson
(74) *Attorney, Agent, or Firm* — Brinks Gilson & Lione

(57) ABSTRACT

The present disclosure provides a method and an apparatus for preventing a field of view of an image capturing device from being shielded when capturing an image. Accordingly, an image capturing device may capture an unobstructed image that is free from any object obstructing the field of view of the image capturing device.

15 Claims, 14 Drawing Sheets

(56) References Cited

U.S. PATENT DOCUMENTS

2012/0013708 A1     1/2012   Okubo
2016/0309085 A1*   10/2016   Ilic ........................ G06T 3/4038

FOREIGN PATENT DOCUMENTS

| CN | 102970477 A | 3/2013 |
|---|---|---|
| CN | 103139547 A | 6/2013 |
| CN | 105491289 A | 4/2016 |

OTHER PUBLICATIONS

International Search Report and Written Opinion dated Aug. 25, 2016 for International Application No. PCT/CN2016/087490, 14 pages.

Office Action dated Aug. 7, 2018 for Chinese Application No. 201510897800.2, 17 pages.

* cited by examiner

METHOD AND APPARATUS FOR PREVENTING PHOTOGRAPH FROM BEING SHIELDED

CROSS REFERENCE TO RELATED APPLICATION

This application claims priority to Chinese Patent Application Serial No. 201510897800.2, filed with the State Intellectual Property Office of P. R. China on Dec. 8, 2015, the entirety of which is hereby incorporated by reference herein.

TECHNICAL FIELD

The present disclosure generally relates to a digital image capturing process implemented on a mobile communication device, and more particularly, to a method and an apparatus for preventing a field of view of an image capturing device from being shielded when capturing an image. Accordingly, an image capturing device may capture an unobstructed image that is free from any object obstructing the field of view of the image capturing device.

BACKGROUND

An existing smart phone is provided with a camera function internally, such that a user may use the camera function in the smart phone to take a picture.

In the related art, when the user uses the smart phone to take a picture, since the user's hand may shield the camera's field of view without the user realizing before taking the picture, for example in a case of snap shooting, the photograph image will be adversely affected by the user's hand blocking at least a portion of the field of view resulting in an image that is blocked by the user's hand.

SUMMARY

According to a first embodiment of the present disclosure, a method for preventing a photograph from being shielded is provided. The method may include: acquiring an image characteristic of an edge region in a picture captured by a camera, in which the image characteristic at least includes image color and an area of a continuous image with same image color; judging whether the image characteristic of the edge region satisfies a predetermined image characteristic condition; and determining that the picture captured by the camera contains a shielding object and issuing a prompt message, if the image characteristic of the edge region satisfies the predetermined image characteristic condition.

According to a second embodiment of the present disclosure, a device for preventing a photograph from being shielded is provided. The device may include: a processor; and a memory configured to store an instruction executable by the processor; in which the processor is configured to: acquire an image characteristic of an edge region in a picture captured by a camera, in which the image characteristic at least includes image color and an area of a continuous image with same image color; judge whether the image characteristic of the edge region satisfies a predetermined image characteristic condition; and determine that the picture captured by the camera contains a shielding object and issue a prompt message, if the image characteristic of the edge region satisfies the predetermined image characteristic condition.

According to a third embodiment of the present disclosure, a non-transitory computer-readable storage medium is provided. The non-transitory computer-readable storage medium has stored therein instructions that, when executed by a processor of a terminal, causes the terminal to perform a method for preventing a photograph from being shielded, the method may include: acquiring an image characteristic of an edge region in a picture captured by a camera, wherein the image characteristic at least comprises image color and an area of a continuous image with same image color; judging whether the image characteristic of the edge region satisfies a predetermined image characteristic condition; and determining that the picture captured by the camera contains a shielding object and issuing a prompt message, if the image characteristic of the edge region satisfies the predetermined image characteristic condition.

BRIEF DESCRIPTION OF THE DRAWINGS

The drawings shown herein, which are incorporated in and constitute a part of the specification, illustrate embodiments of the present disclosure and used for explaining the principle of the present disclosure together with the specification.

DETAILED DESCRIPTION

Figure 1:
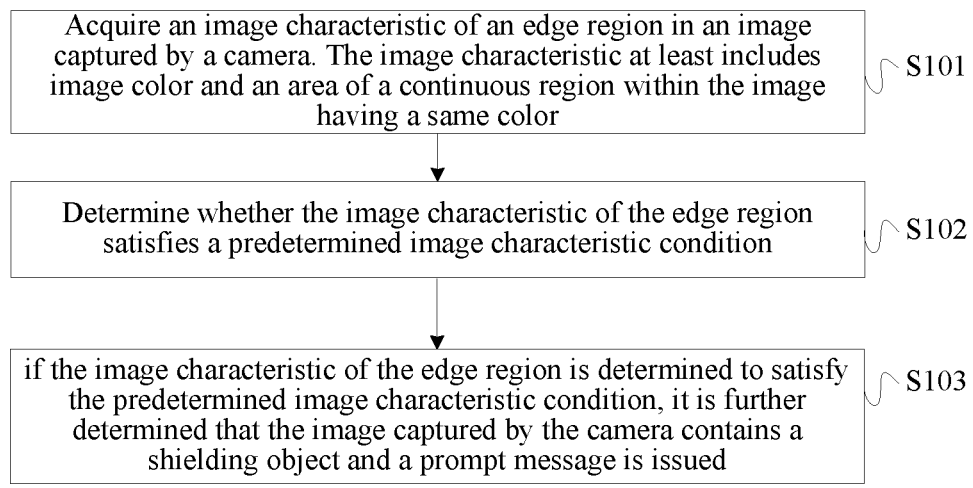
FIG. 1 shows a flow chart of a method for preventing a photograph from being shielded according to an example embodiment of the present disclosure.

Now the example embodiments will be described in detail, in which the examples are shown in the accompanying drawings. In the specification with reference to the drawings, unless specified or limited otherwise, the same or similar elements and the elements having same or similar functions are denoted by like reference numerals. The implementations described in the following example embodiments do not represent all implementations of the present disclosure. Instead, they are examples of the apparatus and method consistent with some aspects of the present disclosure described by the appended claims. Reference to a photograph, picture, or image captured by an image capturing device may relate to a digital image being captured in real-time, or near real-time, by the image capturing device (e.g., digital camera) within a field of view of the image capturing device. For example, the image may be the image projected into a viewfinder screen of a communication device (e.g., smart phone) that the image capturing device is installed on. Alternatively, the image may be a still image, or video, captured by the image capturing device.

FIG. 1 shows a flow chart 100 describing a method for preventing a shielding object from obstructing a view of an image capturing device when the image capturing device captures an image according to an example embodiment of the present disclosure. As shown in FIG. 1, the method is applied to an electronic device (e.g., smart phone) including an image capturing device (e.g., camera), and includes the following processes.

In block S101, acquire an image characteristic of an edge region in an image captured by the camera. The image characteristic at least includes image color and an area of a continuous image sharing a same image color.

The edge region may be defined as a region formed by radiating inward from a boundary of the image a preset distance towards an interior of the picture captured by the camera. For different edges, the preset distance is distinct. For example, in general, the lower edge of the image captured by the camera is prone to be shielded, such that the preset distance for the lower edge may be set to be bigger. And the lower edge may be determined according to an angle at which the smart phone is detected to be held at the time of capturing the image, where the angle of the smart phone may be detected according to a gravity sensor of the user, a gyroscope component, or other angle detection sensor included in the smart phone. If the smart phone is in a horizontal mode, the angle of the smart phone may be determined by the gravity sensor based on the respective level of the left side of the smart phone and the right side of the smart phone with each other (i.e., detection of which side of the smart phone is higher and/or lower).

When a hand of the user shields the camera, objects depicted in the image captured by the camera may have some common characteristics. For example, the color of these objects may be in accordance with a specific color, and these objects with the specific color may be detected and determined to form a continuous region within the image.

In block S102, determine whether the image characteristic of the edge region satisfies a predetermined image characteristic condition.

Since the objects depicted in the edge region of the image when the hand shields the field of view of the camera have predetermined characteristics, when the camera captures the image, it may be determined whether the edge region satisfies with the predetermined image characteristics condition.

In block S103, if the image characteristic of the edge region is determined to satisfy the predetermined image characteristic condition, it is further determined that the image captured by the camera includes a shielding object (e.g., user's hand) and a prompt message is issued.

If the edge region of the image is in accordance with the predetermined image characteristic condition, it may be determined that the picture is shielded, and the smart phone may provide the prompt message to the user in time, for example, popping out a prompt message on a display screen of the smart phone or making a prompt sound through a speaker of the smart phone, such that the user may adjust operational postures in time so as to ensure the effect of the next image being captured.

In addition or alternatively, at block S103 when the smart phone determines the image includes a shielding object, the smart phone may prevent the image capturing device from capturing a still image and/or prevent initiation of video recording. The smart phone may prevent the image capturing device from capturing the still image and/or prevent the initiation of video recording by issuing a prevention command. The smart phone may prevent the image capturing device from capturing the still image and/or prevent the initiation of video recording until, for example, the shielding object is no longer detected or the smart phone receives an input command recognizing the prompt message and overriding the prevention command.

In addition or alternatively, at block S103 when the smart phone determines the image includes a shielding object, the smart phone may delete the image when the image is a still image captured by the image capturing device and stored in a memory of the smart phone.

In addition or alternatively, following block S103, after the shielding object is no longer detected, the smart phone may automatically control the image capturing device to capture a still image and/or initiate video recording.

As described above, the method described by flow chart 100 may be applied to an image within a viewfinder of the image capturing device, or for a still image or video recording captured by the image capturing device. This way, the processes described by flow chart 100 may be applied to the real-time image being depicted within the field of view of the image capturing device prior to the capture of the image, or to images captured and stored on a memory of the smart phone.

In this embodiment, the image characteristic of the edge region in the image captured by the camera is acquired and compared with the predetermined image characteristic condition, and if the image characteristic matches with the predetermined image characteristic condition, it may be determined that the picture is shielded, and then the user is reminded to adjust operational postures timely so as to ensure that the effect of the photograph is not affected.

Figure 2:
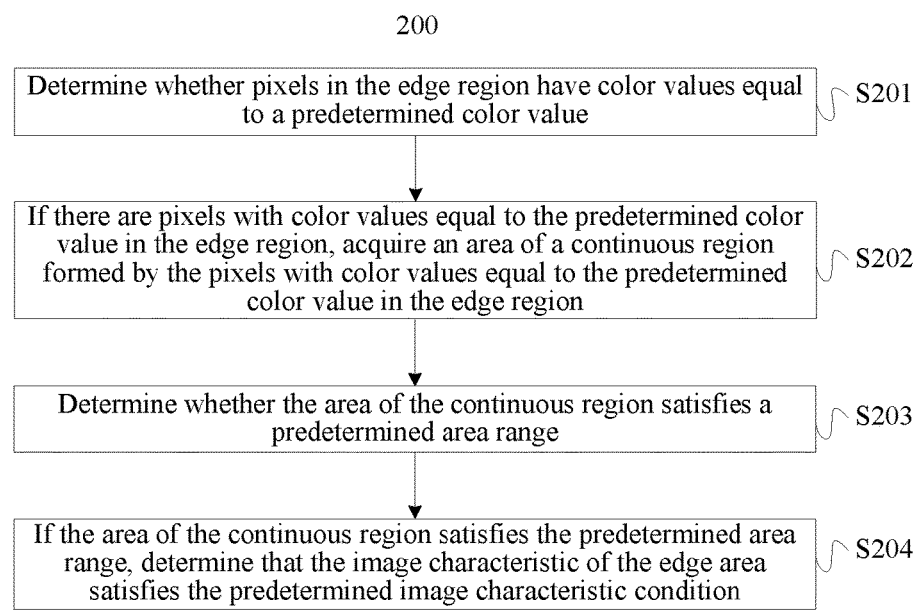
FIG. 2 shows a flow chart of a method for preventing a photograph from being shielded according to another example embodiment of the present disclosure.

FIG. 2 shows a flow chart 200 of a method for preventing a shielding object from obstructing a view of an image capturing device when the image capturing device captures an image according to another example embodiment of the present disclosure. As shown by the flow chart 200 in FIG. 2, the process described by block S102 in flow chart 100 may include the following processes.

In block S201, determine whether pixels in the edge region of the image have color values equal to a predetermined color value.

As described above, if the user's hand shields the camera's field of view, image captured by the camera may have some common predetermined characteristics. For example, the color of objects within an edge region, or other specific region of the image, may have a specific color (e.g., known skin tone colors), and these objects having the specific color may form a continuous region.

In this block S201, the smart phone first determines whether there are the pixels in the edge region with color values equal to the predetermined color value, where the predetermined color value may be a color value corresponding to pink or corresponding to gray.

In block S202, if pixels with color values equal to the predetermined color value are found in the edge region of the image, acquire an area of a continuous region formed by the pixels with color values equal to the predetermined color value in the edge region.

The continuous region is formed by splicing adjacent pixels, and the color values of these pixels are equal to the predetermined color value, i.e., the continuous region cannot contain a pixel with another color value.

In block S203, determine whether the area of the continuous region satisfies a predetermined area range.

The area of the continuous region is an area formed by the adjacent pixels with color values equal to the predetermined color value. If the area reaches a preset area, it may be determined that the picture is shielded by, for example, the user's finger or other object.

For different edges of the image, the predetermined area range may be set to be distinct. For example, for the lower edge of the image, the predetermined area range may be set to be bigger than for the upper edge of the image.

In block S204, if the area of the continuous region satisfies the predetermined area range, determine that the image characteristic of the edge region satisfies the predetermined image characteristic condition.

In this embodiment, by determining whether the edge region contains the predetermined color value and whether the area of the region formed by the predetermined color value reaches a predetermined area, it may be determined whether the image is shielded, thus improving the accuracy of identifying the shielding object.

Figure 3:
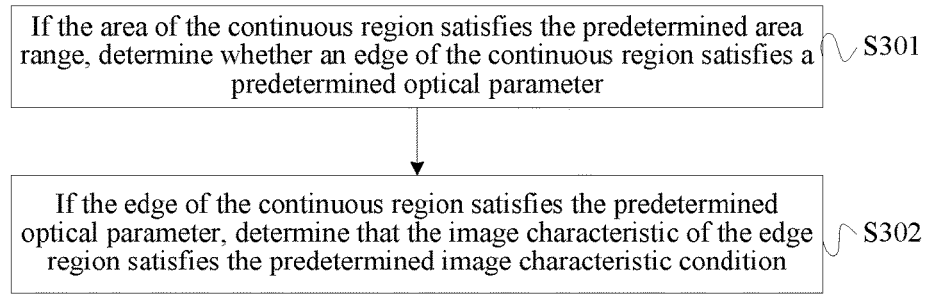
FIG. 3 shows a flow chart of a method for preventing a photograph from being shielded according to yet another example embodiment of the present disclosure.

FIG. 3 shows a flow chart 300 describing a method for preventing a shielding object from obstructing a view of an image capturing device when the image capturing device captures an image according to another example embodiment of the present disclosure. As shown in FIG. 3, based on the determining method shown in FIG. 2, the following determining method may be added to the method described by flow chart 200.

In block S301, if the area of the continuous region satisfies the predetermined area range, determine whether an edge of the continuous region satisfies a predetermined optical parameter.

If the image capture device's field of view is shielded by the user's hand and/or the image includes the obstructions of the user's hand, the edge of the sub image formed when the picture is shielded is in accordance with optical diffraction characteristics, i.e., the specific optical parameter. In this block S301, determine whether the edge of the continuous region satisfies the predetermined optical parameter.

In block S302, if the edge of the continuous region satisfies the predetermined optical parameter, determine that the image characteristic of the edge region satisfies the predetermined image characteristic condition.

In this embodiment, under the prerequisite of satisfying the predetermined color value and the predetermined area range, the smart phone further determines whether the image of the edge region satisfies the predetermined optical parameter, and if the image of the edge region is determined to satisfy the predetermined optical parameter, the picture is determined to be shielded. In this way, the accuracy of identifying the shielding object is further improved.

Figure 4:
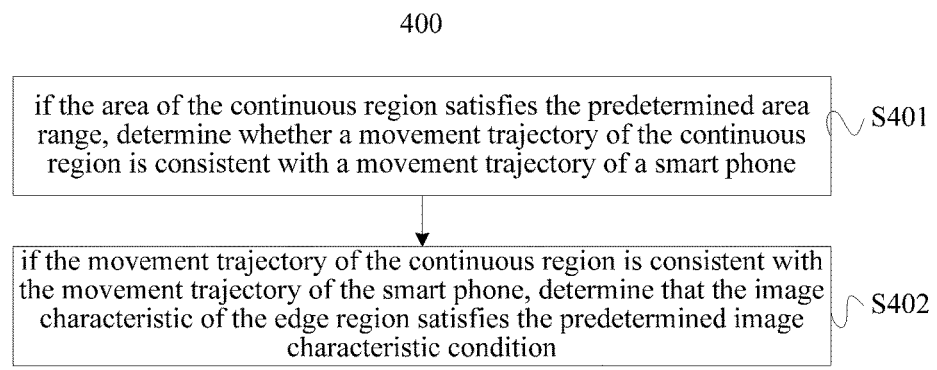
FIG. 4 shows a flow chart of a method for preventing a photograph from being shielded according to still another example embodiment of the present disclosure.

FIG. 4 shows a flow chart 400 of a method for preventing a shielding object from obstructing a view of an image capturing device when the image capturing device captures an image according to yet another example embodiment of the present disclosure. As shown in FIG. 4, based on the determining method shown in FIG. 2, the following processes may be added to the method described by flow chart 200.

In block S401, if the area of the continuous region satisfies the predetermined area range, determine whether a movement trajectory of the continuous region is consistent with a movement trajectory of the smart phone.

When the user takes a picture with the image capturing device, the scene to be photographed may be in a static state, or may have a movement trajectory different from the movement trajectory of the smart phone. If the movement trajectory of the edge region in the image is consistent with the movement trajectory of the smart phone, it may be determined that the edge region is shielded by the user's hand.

It may be determined whether the movement trajectory of the continuous region is consistent with that of the smart phone by a positioning method or the like.

In block S402, if the movement trajectory of the continuous region is consistent with the movement trajectory of the smart phone, determine that the image characteristic of the edge region satisfies the predetermined image characteristic condition.

If the movement trajectory of the continuous region is consistent with the movement trajectory of the terminal, i.e., the continuous region moves with the movement of the terminal, it may be determined that the continuous region is shielded.

In this embodiment, under the prerequisite of satisfying the predetermined color value and the predetermined area range, the smart phone further determines whether the movement trajectory of the edge region is consistent with the movement trajectory of the smart phone, and if the movement trajectory of the edge region is determined to be consistent with the movement trajectory of the smart phone, then it may be determined that the picture is shielded. In this way, the accuracy of identifying the shielding object is further improved.

Figure 5:
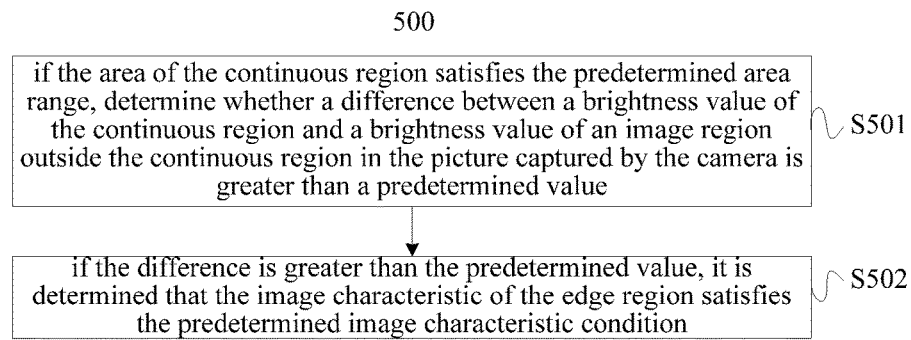
FIG. 5 shows a flow chart of a method for preventing a photograph from being shielded according to still yet another example embodiment of the present disclosure.

FIG. 5 shows a flow chart 500 of a method for preventing a shielding object from obstructing a view of an image capturing device when the image capturing device captures an image according to still another example embodiment of the present disclosure. As shown in FIG. 5, based on the determining method shown in FIG. 2, the following processes may be added to the method described by flow chart 200.

In block S501, if the area of the continuous region satisfies the predetermined area range, determine whether a difference between a brightness value of the continuous region and a brightness value of an image region outside the continuous region in the image captured by the camera is greater than a predetermined value.

When the user takes a picture with the image capturing device, the image captured by the camera is likely to have a uniform brightness, or at least a range of brightness within a certain close range. However if the image is shielded, the portion of the image that is shielded will have a brightness characteristic that is clearly distinguished from the remaining unobstructed portions of the image (e.g., the shielded portion of the image will be much darker than the unshielded portion of the image). In this block, by detecting the difference between the brightness value of the continuous region and the brightness value of the remaining portion of the image captured by the camera, it may be determined whether the continuous region is shielded.

In block S502, if the difference is greater than the predetermined value, it is determined that the image characteristic of the edge region satisfies the predetermined image characteristic condition.

The predetermined value may be acquired by experiments or according to experience data.

If the difference is greater than the predetermined value, it may be determined that the picture is shielded.

In this embodiment, under the prerequisite of satisfying the predetermined color value and the predetermined area range, the terminal further determines the difference between the brightness value of the edge region and the brightness value of the other part in the picture, and if the difference is too big, it is considered that the picture is shielded. In this way, the accuracy of identifying the shielding object is further improved.

Figure 6:
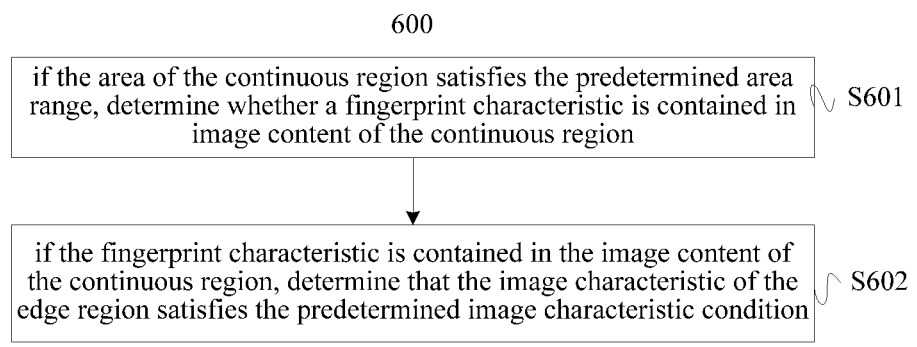
FIG. 6 shows a flow chart of a method for preventing a photograph from being shielded according to still yet another example embodiment of the present disclosure.

FIG. 6 shows a flow chart 600 of a method for preventing a shielding object from obstructing a view of an image capturing device when the image capturing device captures an image according to still yet another example embodiment of the present disclosure. As shown in FIG. 6, based on the determining method shown in FIG. 2, the following processes may be added to the method described by flow chart 200.

In block S601, if the area of the continuous region satisfies the predetermined area range, determine whether a fingerprint characteristic is contained in image content of the continuous region.

If the continuous region is shielded by the user's hand, an image in accordance with the fingerprint characteristic may appear. By detecting whether the fingerprint characteristic is contained in the image content, it may be judged whether the continuous region is shielded. The fingerprint characteristic may be a predefined fingerprint image that may be referenced to determine if a portion of the image matches the predefined fingerprint image.

In block S602, if the fingerprint characteristic is contained in the image content of the continuous region, determine that the image characteristic of the edge region satisfies the predetermined image characteristic condition.

In this embodiment, under the prerequisite of satisfying the predetermined color value and the predetermined area range, the smart phone further determines whether the fingerprint characteristic is contained in the image content of the edge region, and if the fingerprint characteristic is determined to be contained in the image content of the edge region, it is considered that the picture is shielded. In this way, the accuracy of identifying the shielding object is further improved.

Figure 7:
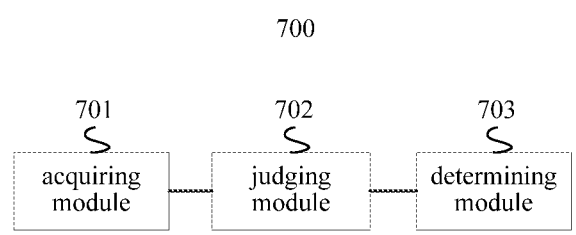
FIG. 7 shows a block diagram of an apparatus for preventing a photograph from being shielded according to an example embodiment of the present disclosure.

FIG. 7 shows a block diagram of an apparatus 700 for preventing a shielding object from obstructing a view of an image capturing device when the image capturing device captures an image according to an example embodiment of the present disclosure. Referring to FIG. 7, the apparatus 700 includes an acquiring module 701, a judging module 702 and a determining module 703.

The acquiring module 701 is configured to acquire an image characteristic of an edge region in an image captured by a camera, in which the image characteristic at least includes image color and an area of a continuous image having a same image color within the image, as described herein.

The judging module 702 is configured to determine whether the image characteristic of the edge region satisfies a predetermined image characteristic condition, as described herein.

The determining module 703 is configured to determine that the image captured by the camera contains a shielding object and to control the presentation of a prompt message when the image characteristic of the edge region satisfies the predetermined image characteristic condition, as described herein.

Figure 8:
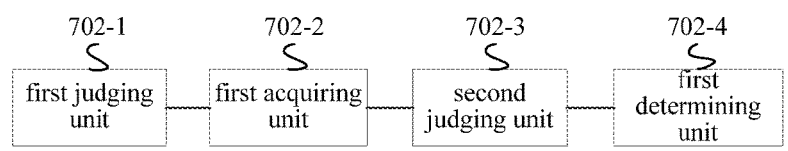
FIG. 8 shows a block diagram of an apparatus for preventing a photograph from being shielded according to another example embodiment of the present disclosure.

FIG. 8 shows a block diagram of an apparatus 800 for shielding object from obstructing a view of an image capturing device when the image capturing device captures an image according to another example embodiment of the present disclosure. The apparatus 800 shows the judging module 702 from apparatus 700 shown in FIG. 7 including a first judging unit 702-1, a first acquiring unit 702-2, a second judging unit 702-3 and a first determining unit 702-4.

The first judging unit 702-1 is configured to determine whether pixels in the edge region have color values equal to a predetermined color value, as described herein.

The first acquiring unit 702-2 is configured to acquire an area of a continuous region formed by the pixels having color values equal to the predetermined color value in the edge region, when it is determined there are pixels having color values equal to the predetermined color value in the edge region, as described herein.

The second judging unit 702-3 is configured to determine whether the area of the continuous region satisfies a predetermined area range, as described herein.

The first determining unit 702-4 is configured to determine that the image characteristic of the edge region satisfies the predetermined image characteristic condition, when the area of the continuous region satisfies the predetermined area range, as described herein.

Figure 9:
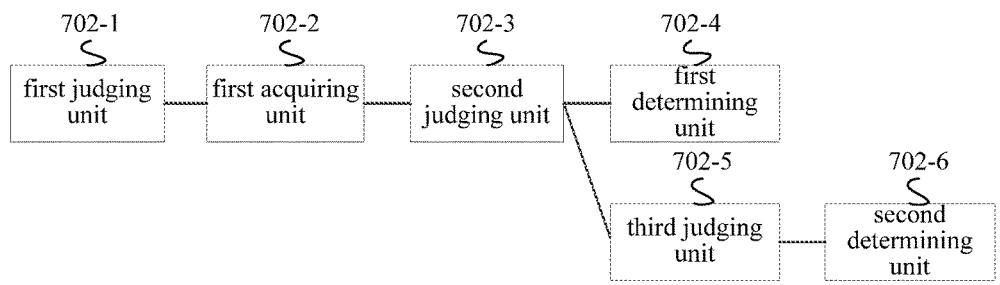
FIG. 9 shows a block diagram of an apparatus for preventing a photograph from being shielded according to yet another example embodiment of the present disclosure.

FIG. 9 shows a block diagram of an apparatus 900 for shielding object from obstructing a view of an image capturing device when the image capturing device captures an image according to yet example embodiment of the present disclosure. The apparatus 900 shows the judging module 702 shown in FIG. 8 further including a third judging unit 702-5 and a second determining unit 702-6.

The third judging unit 702-5 is configured to determine whether an edge of the continuous region satisfies a predetermined optical parameter, when the area of the continuous region satisfies the predetermined area range, as described herein.

The second determining unit 702-6 is configured to determine that the image characteristic of the edge region satisfies the predetermined image characteristic condition, when the edge of the continuous region satisfies the predetermined optical parameter, as described herein.

Figure 10:
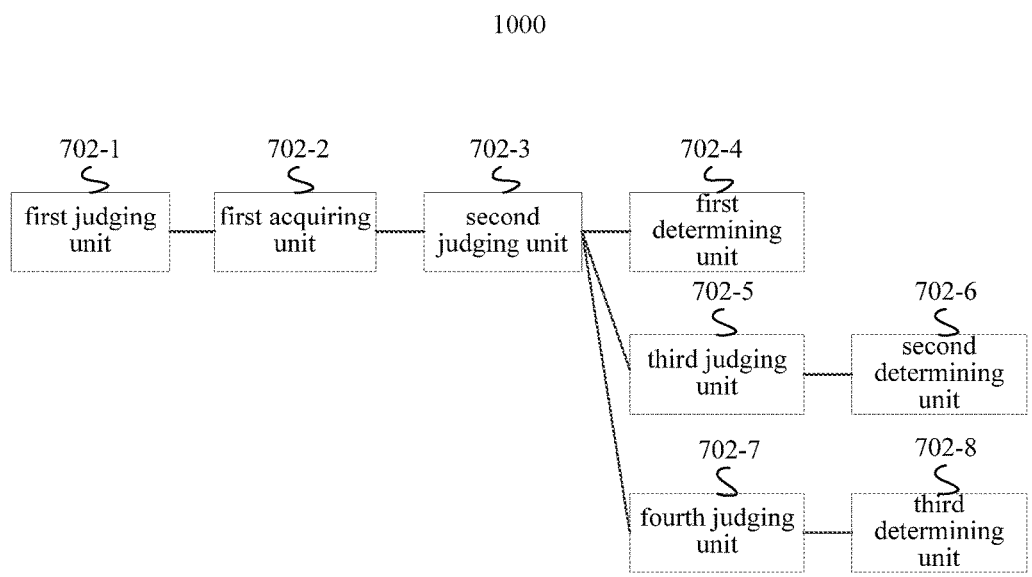
FIG. 10 shows a block diagram of an apparatus for preventing a photograph from being shielded according to still another example embodiment of the present disclosure.

FIG. 10 shows a block diagram of an apparatus 1000 for shielding object from obstructing a view of an image capturing device when the image capturing device captures an image according to still another example embodiment of the present disclosure. The apparatus 1000 shows the judging module 702 shown in FIG. 9 further including a fourth judging unit 702-7 and a third determining unit 702-8.

The fourth judging unit 702-7 is configured to determine whether a movement trajectory of the continuous region is consistent with a movement trajectory of a smart phone, if the area of the continuous region satisfies the predetermined area range, as described herein.

The third determining unit 702-8 is configured to determine that the image characteristic of the edge region satisfies the predetermined image characteristic condition, when the movement trajectory of the continuous region is consistent with the movement trajectory of the smart phone, as described herein.

Figure 11:
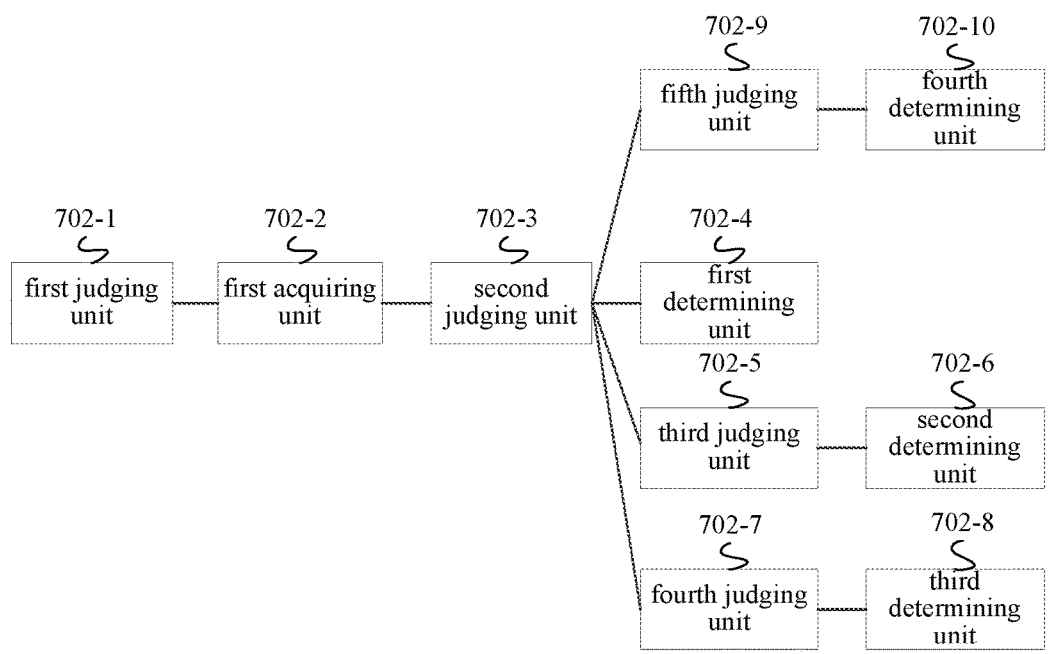
FIG. 11 shows a block diagram of an apparatus for preventing a photograph from being shielded according to still yet another example embodiment of the present disclosure.

FIG. 11 shows a block diagram of an apparatus 1100 for preventing a shielding object from obstructing a view of an image capturing device when the image capturing device captures an image according to still another example embodiment of the present disclosure. The apparatus 1100 shows the judging module 702 shown in FIG. 10 further including a fifth judging unit 702-9 and a fourth determining unit 702-10.

The fifth judging unit 702-9 is configured to determine whether a difference between a brightness value of the continuous region and a brightness value of an image region outside the continuous region in the picture captured by the camera is greater than a predetermined value, when the area of the continuous region satisfies the predetermined area range, as described herein.

The fourth determining unit 702-10 is configured to determine that the image characteristic of the edge region satisfies the predetermined image characteristic condition, when the difference is greater than the predetermined value, as described herein.

Figure 12:
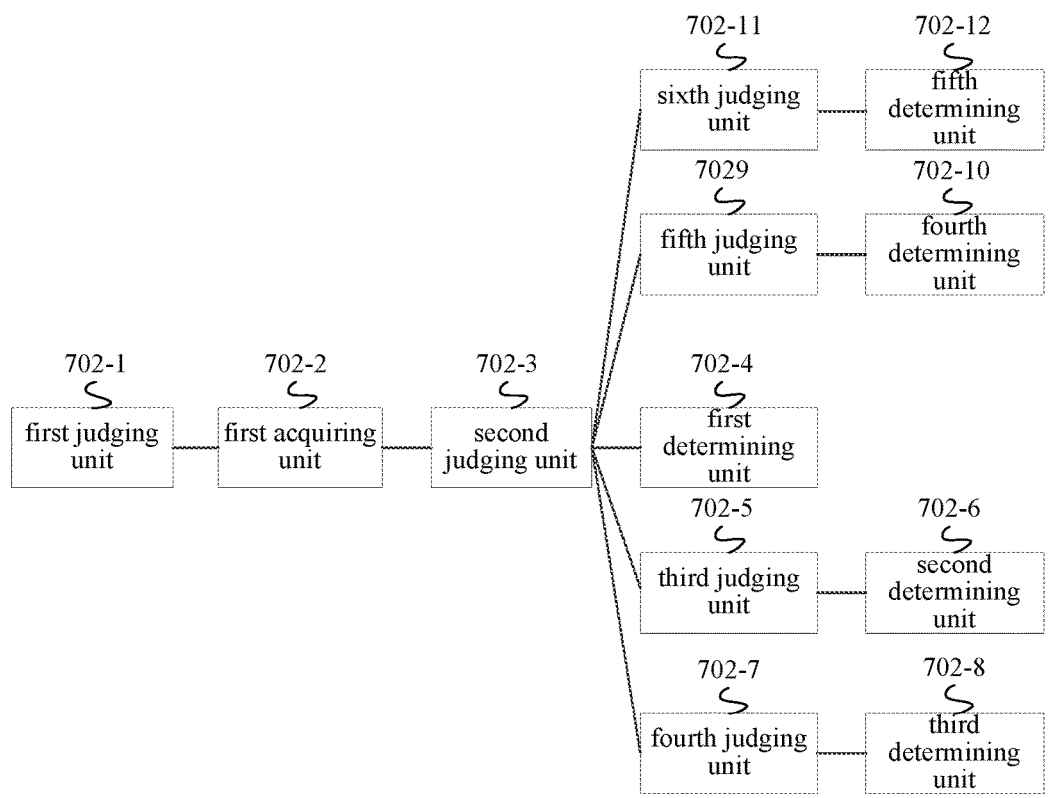
FIG. 12 shows a block diagram of an apparatus for preventing a photograph from being shielded according to still yet another example embodiment of the present disclosure.

FIG. 12 shows a block diagram of an apparatus 1200 for preventing a shielding object from obstructing a view of an image capturing device when the image capturing device captures an image according to still yet another example embodiment of the present disclosure. The apparatus 1200 shows the judging module 702 shown in FIG. 11 further including a sixth judging unit 702-11 and a fifth determining unit 702-12.

The sixth judging unit 702-11 is configured to determine whether a fingerprint characteristic is contained in image content of the continuous region, when the area of the continuous region satisfies the predetermined area range, as described herein.

The fifth determining unit 702-12 is configured to determine that the image characteristic of the edge region satisfies the predetermined image characteristic condition, when the fingerprint characteristic is contained in the image content of the continuous region, as described herein.

With respect to the apparatus in the above embodiments, the specific operation modes of individual modules therein have been described in detail in the embodiments regarding the processing methods, which will not be elaborated herein.

Figure 13:
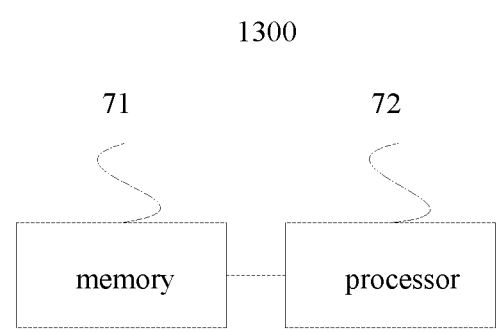
FIG. 13 shows a block diagram of a terminal according to an example embodiment of the present disclosure.

The internal functional modules and structure of the apparatus for preventing a shielding object from obstructing a view of an image capturing device when the image capturing device captures an image have been described above. FIG. 13 shows a block diagram of a device 1300 that may represent the apparatus described according to an exemplary embodiment of the present disclosure. As shown in FIG. 13, the device 1300 includes a memory 71 and a processor 72.

The memory 71 is configured to store instructions executable by the processor, where the instructions cause the processor 72 to implement one or more of the methods described herein.

The processor 72 is configured to execute the instructions stored on the memory 71 to implement one or more of the methods described herein. For example, the processor 72 may execute the instructions to: acquire an image characteristic of an edge region in a picture captured by a camera, in which the image characteristic at least includes image color and an area of a continuous image with same image color; determine whether the image characteristic of the edge region satisfies a predetermined image characteristic condition; and determine that the picture captured by the camera contains a shielding object and issue a prompt message, when the image characteristic of the edge region satisfies the predetermined image characteristic condition.

It should be understood that, the processor 72 may be a central processing unit (CPU), or may be another general processor, a digital signal processor (DSP), an application specific integrated circuit (ASIC), or the like. The general processor may be a microprocessor, or may be other regular processors, or the like. And the above memory may be a read-only memory (ROM), a random access memory (RAM), a flash memory, a disk or a solid state disk. A SIM card is known as a user identification card, an intelligent card, and a digital mobile phone provided with the SIM card can be used. That is, the computer chip stores information of a user of the digital mobile phone and content such as an encrypted cipher code and a telephone dictionary, or the like. The steps in the method disclosed by combining embodiments of the present disclosure may be implemented by a hardware processor or a combination of hardware and software modules in the processor.

Figure 14:
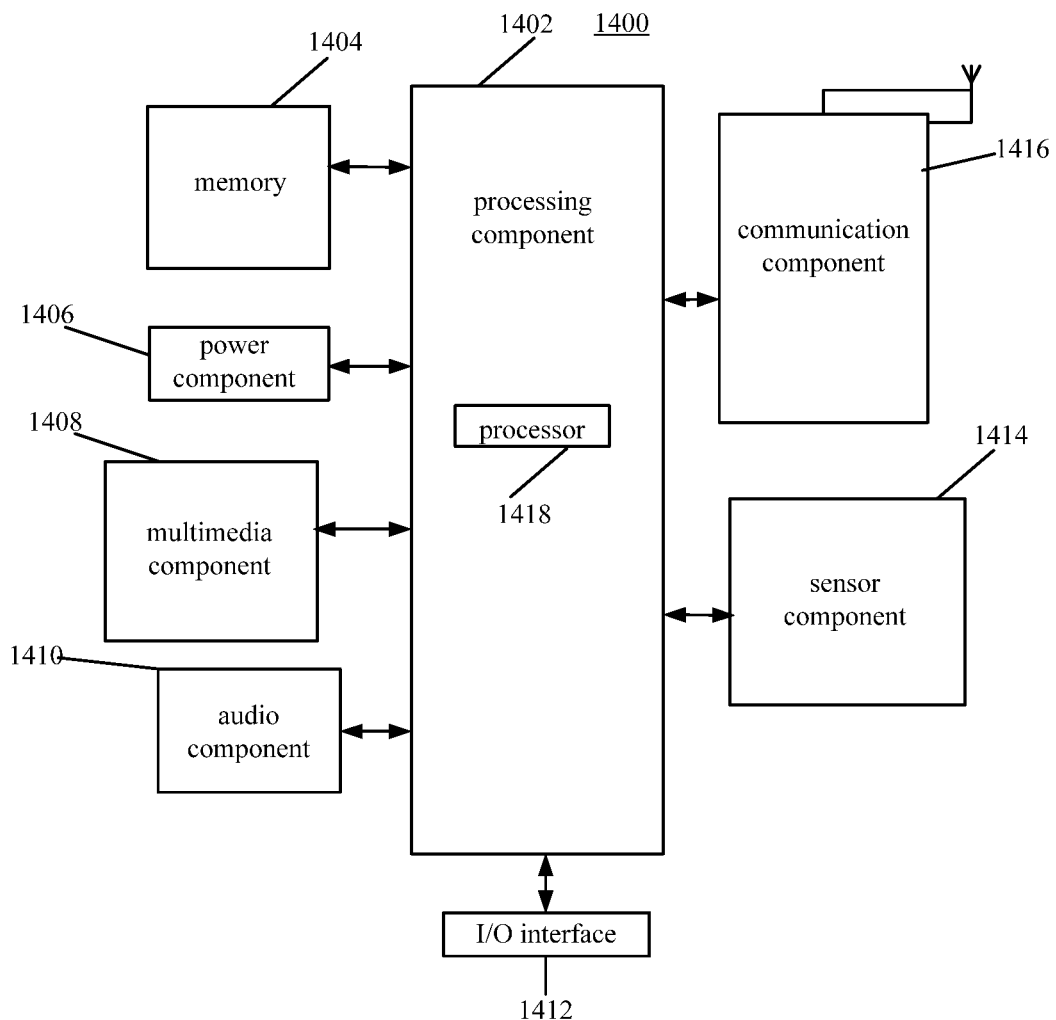
FIG. 14 shows a block diagram of a device for preventing a photograph from being shielded according to an example embodiment of the present disclosure.

FIG. 14 shows a block diagram of a device 1400 for preventing a photograph from being shielded according to an example embodiment of the present disclosure. For example, the device 800 may be a mobile phone, a computer, a digital broadcasting terminal, a messaging device, a game console, a tablet device, a medical device, exercise equipment, and a personal digital assistant, etc.

Referring to FIG. 14, the device 1400 may include one or more of following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1418 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1408 includes a front camera and/or a rear camera. The front camera and the rear camera may receive external multimedia data while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400 and relative positioning of components (e.g., the display and the keypad of the device 1400). The sensor component 1414 may also detect a change in position of the device 1400 or of a component in the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate wired or wireless communication between the device 1400 and other devices. The device 1400 can access a wireless network based on a communication standard, such as WIFI, 2G or 3G or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 1404 including instructions. The above instructions are executable by the processor 1418 in the device 1400, for performing the above-described methods. For example, the non-transitory computer-readable storage medium may be a ROM, a RAM, a CD-ROM, a magnetic tape, a floppy disc, an optical data storage device, and the like.

Each module, submodule, or unit discussed herein, may take the form of a packaged functional hardware unit designed for use with other components, a portion of a program code (e.g., software or firmware) executable by the processor 1418 or the processing circuitry that usually performs a particular function of related functions, or a self-contained hardware or software component that interfaces with a larger system, for example.

A non-transitory computer-readable storage medium including instructions, when the instructions are excused by a processor of the device 1400, the device 1400 may perform a method for preventing a photograph from being shielded, the method including: acquiring an image characteristic of an edge region in a picture captured by a camera, in which the image characteristic at least includes image color and an area of a continuous image with same image color; judging whether the image characteristic of the edge region satisfies a predetermined image characteristic condition; and determining that the picture captured by the camera contains a shielding object and issue a prompt message, if the image characteristic of the edge region satisfies the predetermined image characteristic condition.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing form the scope thereof. It is intended that the scope of the present disclosure only be limited by the appended claims.

What is claimed is:

1. A method for preventing a photograph from being shielded, comprising:

acquiring an image characteristic of an edge region in a picture captured by a camera, wherein the image characteristic at least comprises image color and an area of a continuous image with same image color;

determining whether the image characteristic of the edge region satisfies a predetermined image characteristic condition;

determining that the picture captured by the camera is shielded and issuing a prompt message, when the image characteristic of the edge region satisfies the predetermined image characteristic condition; and wherein determining whether the image characteristic of the edge region satisfies a predetermined image characteristic condition comprises:

determining the edge region includes pixels with color values equal to a predetermined color value;

acquiring an area of a continuous region formed by the pixels with color values equal to the predetermined color value in the edge region;

determining whether the area of the continuous region satisfies a predetermined area range;

determining whether an edge of the continuous region satisfies a predetermined optical parameter, when the area of the continuous region satisfies the predetermined area range; and determining the image characteristic of the edge region satisfies the predetermined image characteristic condition when the area of the continuous region satisfies the predetermined area range and the edge of the continuous region satisfies the predetermined optical parameter.

2. The method according to claim 1, wherein judging whether the image characteristic of the edge region satisfies a predetermined image characteristic condition further comprises:

judging whether a movement trajectory of the continuous region is consistent with a movement trajectory of a terminal, if the area of the continuous region satisfies the predetermined area range; and determining that the image characteristic of the edge region satisfies the predetermined image characteristic condition, if the movement trajectory of the continuous region is consistent with the movement trajectory of the terminal.

3. The method according to claim 1, wherein judging whether the image characteristic of the edge region satisfies a predetermined image characteristic condition further comprises:

judging whether a difference between a brightness value of the continuous region and a brightness value of an image region except the continuous region in the picture captured by the camera is greater than a predetermined value, if the area of the continuous region satisfies the predetermined area range; and determining that the image characteristic of the edge region satisfies the predetermined image characteristic condition, if the difference is greater than the predetermined value.

4. The method according to claim 1, wherein judging whether the image characteristic of the edge region satisfies a predetermined image characteristic condition further comprises:

judging whether a fingerprint characteristic is contained in image content of the continuous region, if the area of the continuous region satisfies the predetermined area range; and determining that the image characteristic of the edge region satisfies the predetermined image characteristic condition, if the fingerprint characteristic is contained in the image content of the continuous region.

5. The method according to claim 1, wherein the predetermined optical parameter is an optical diffraction characteristic.

6. A device for preventing a photograph from being shielded, comprising:

a processor; and a memory configured to store an instruction executable by the processor;

wherein the processor is configured to:

acquire an image characteristic of an edge region in a picture captured by a camera, wherein the image characteristic at least comprises image color and an area of a continuous image with same image color;

determine whether the image characteristic of the edge region satisfies a predetermined image characteristic condition;

determine that the picture captured by the camera is shielded and issue a prompt message, when the image characteristic of the edge region satisfies the predetermined image characteristic condition; and wherein the processor is configured to determine whether the image characteristic of the edge region satisfies a predetermined image characteristic condition by:

determining the edge region includes pixels with color values equal to a predetermined color value;

acquiring an area of a continuous region formed by the pixels with color values equal to the predetermined color value in the edge region;

determining whether the area of the continuous region satisfies a predetermined area range;

determining whether an edge of the continuous region satisfies a predetermined optical parameter, when the area of the continuous region satisfies the predetermined area range; and determining the image characteristic of the edge region satisfies the predetermined image characteristic condition when the area of the continuous region satisfies the predetermined area range and the edge of the continuous region satisfies the predetermined optical parameter.

7. The device according to claim 6, wherein the processor is further configured to judge whether the image characteristic of the edge region satisfies the predetermined image characteristic condition by acts of:

judging whether a movement trajectory of the continuous region is consistent with a movement trajectory of a terminal, if the area of the continuous region satisfies the predetermined area range; and determining that the image characteristic of the edge region satisfies the predetermined image characteristic condition, if the movement trajectory of the continuous region is consistent with the movement trajectory of the terminal.

8. The device according to claim 6, wherein the processor is further configured to judge whether the image characteristic of the edge region satisfies the predetermined image characteristic condition by acts of:

judging whether a difference between a brightness value of the continuous region and a brightness value of an image region except the continuous region in the picture captured by the camera is greater than a predetermined value, if the area of the continuous region satisfies the predetermined area range; and determining that the image characteristic of the edge region satisfies the predetermined image characteristic condition, if the difference is greater than the predetermined value.

9. The device according to claim 6, wherein the processor is further configured to judge whether the image characteristic of the edge region satisfies the predetermined image characteristic condition by acts of:

judging whether a fingerprint characteristic is contained in image content of the continuous region, if the area of the continuous region satisfies the predetermined area range; and determining that the image characteristic of the edge region satisfies the predetermined image characteristic condition, if the fingerprint characteristic is contained in the image content of the continuous region.

10. The device according to claim 6, wherein the predetermined optical parameter is optical diffraction characteristic.

11. A non-transitory computer-readable storage medium having stored therein instructions that, when executed by a processor of a terminal, causes the terminal to perform a method for preventing a photograph from being shielded, the method comprising:

acquiring an image characteristic of an edge region in a picture captured by a camera, wherein the image characteristic at least comprises image color and an area of a continuous image with same image color;

determining whether the image characteristic of the edge region satisfies a predetermined image characteristic condition; and determining that the picture captured by the camera is shielded and issuing a prompt message, when the image characteristic of the edge region satisfies the predetermined image characteristic condition;

wherein determining whether the image characteristic of the edge region satisfies a predetermined image characteristic condition comprises:

determining the edge region includes pixels with color values equal to a predetermined color value;

acquiring an area of a continuous region formed by the pixels with color values equal to the predetermined color value in the edge region;

determining whether the area of the continuous region satisfies a predetermined area range;

determining whether an edge of the continuous region satisfies a predetermined optical parameter, when the area of the continuous region satisfies the predetermined area range; and determining the image characteristic of the edge region satisfies the predetermined image characteristic condition when the area of the continuous region satisfies the predetermined area range and the edge of the continuous region satisfies the predetermined optical parameter.

12. The non-transitory computer-readable storage medium according to claim 11, wherein judging whether the image characteristic of the edge region satisfies a predetermined image characteristic condition further comprises:

judging whether a movement trajectory of the continuous region is consistent with a movement trajectory of a terminal, if the area of the continuous region satisfies the predetermined area range; and determining that the image characteristic of the edge region satisfies the predetermined image characteristic condition, if the movement trajectory of the continuous region is consistent with the movement trajectory of the terminal.

13. The non-transitory computer-readable storage medium according to claim 11, wherein judging whether the image characteristic of the edge region satisfies a predetermined image characteristic condition further comprises:

judging whether a difference between a brightness value of the continuous region and a brightness value of an image region except the continuous region in the picture captured by the camera is greater than a predetermined value, if the area of the continuous region satisfies the predetermined area range; and determining that the image characteristic of the edge region satisfies the predetermined image characteristic condition, if the difference is greater than the predetermined value.

14. The non-transitory computer-readable storage medium according to claim 11, wherein judging whether the image characteristic of the edge region satisfies a predetermined image characteristic condition further comprises:

judging whether a fingerprint characteristic is contained in image content of the continuous region, if the area of the continuous region satisfies the predetermined area range; and determining that the image characteristic of the edge region satisfies the predetermined image characteristic condition, if the fingerprint characteristic is contained in the image content of the continuous region.

15. The non-transitory computer-readable storage medium according to claim 11, wherein the predetermined optical parameter is optical diffraction characteristic.

* * * * *